Feb. 2, 1960     G. A. LYON     2,923,573
WHEEL COVER
Filed July 22, 1955
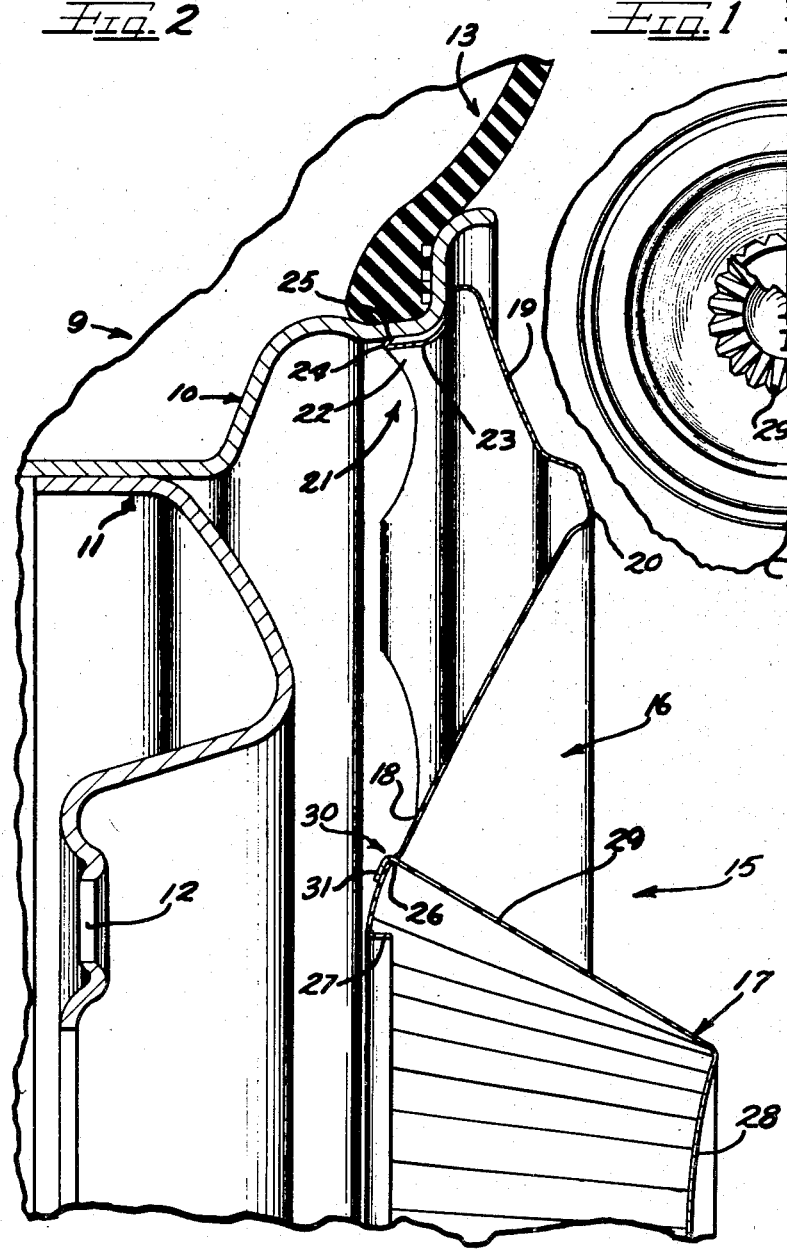
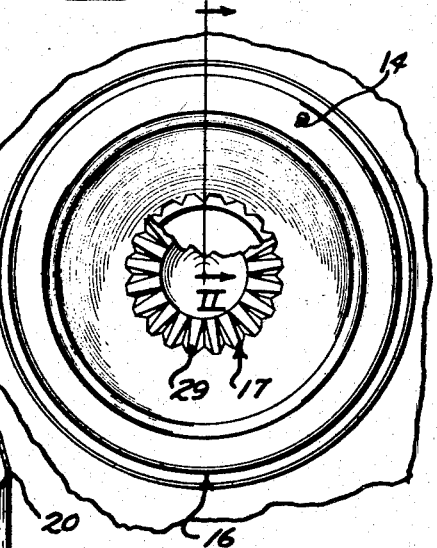
Inventor
GEORGE ALBERT LYON

United States Patent Office 2,923,573
Patented Feb. 2, 1960

2,923,573

WHEEL COVER

George Albert Lyon, Detroit, Mich.

Application July 22, 1955, Serial No. 523,757

7 Claims. (Cl. 301—37)

This invention relates to wheel structures and more particularly to a cover for disposition on the outer side of a vehicle wheel.

In the automobile industry there is a never ending quest for new and more highly outstanding wheel covers capable of meeting the public's fancy while at the same time embodying certain required features in order to insure that the cover may be properly retained on the wheel.

The present invention relates to a multi-part cover construction wherein the centrally disposed member has an unusually high crown while at the same time being of an unusual configuration. Such a cover construction does not as readily lend itself to being made in one piece as in two pieces in view of the peculiar configuration of the high crown along with its unusually large size.

Accordingly, it is an object of this invention to provide a novel multi-part cover construction.

A further object of this invention is to provide novel retaining means for mounting the cover members in unitary assembled relation.

A still further object of this invention is to provide in a multi-part cover construction means for assembling the cover capable of insuring relative co-rotation of the cover members when mounted on a wheel.

Another object of this invention is to provide an improved wheel cover which affords an entirely different ornamental look to the wheel.

Still another object of this invention is to provide a cover construction which may be economically manufactured on a larger production basis.

Other objects and features of this invention will more fully appear from the following detailed description taken in connection with the accompanying drawing which illustrates a single embodiment thereof and in which:

Figure 1 is a fragmentary side view of a wheel carrying the cover embodying the features of this invention; and Figure 2 is an enlarged fragmentary cross-sectional view taken on substantially line II—II of Figure 1 looking in the direction indicated by the arrows.

As shown on the drawings:

The reference numeral 9 indicates generally my novel wheel structure embodying features of this invention and includes a conventional stepped rim part 10 connected to and supported by a body part 11 provided with a bolt-on flange 12 capable of being secured to a wheel axle. Suitably mounted upon the wheel part 10 is a tubeless tire assembly 13 capable of being inflated by means of the valve 14.

Mounted upon the wheel is my novel cover 15 including an outer cover member 16 and an inner relatively large cover member 17.

The outer cover member 16 has diverging portions 18 and 19 connected together by an annular rib 20. Disposed on the outer margin of the cover member 16 are retaining means 21 capable of holding the cover on the wheel. The retaining means 21 comprise integral axially inwardly turned circumferentially spaced resilient spring fingers 22 including a relatively long leg 23 and a relatively short stiff leg 24 terminating in a gripping extremity or edge 25.

Provided on the radially inner area of the cover member 16 are a plurality of circumferentially spaced slots 26. The cover member 16 has an annular turned terminal 27 capable of reinforcing the diverging annular portion 18.

The relatively large cover member 17 includes a concave or dished portion 28 which terminates in an annular generally axially inwardly radially outwardly extending elongated resilient corrugated side wall 29. Preferably provided at circumferentially spaced intervals on the preferably axially inner radially outer edge area or portion 30 of the side wall 29 are a plurality of deformable integral tabs 31. The tabs 31 are movable with the resilient side wall 29 in a radial direction for tensioned engagement with the radially outer edges of the slots 26.

In assembly of the cover members 16 and 17, by virtue of the resilient nature of the corrugated side wall 29, the side wall may be readily flexed inwardly in such a manner that the tabs 31 may be axially aligned and inserted through the slots 26. After insertion of the tabs 31 through the slots, the tabs are then bent so as to secure the cover members in unitary relation. By reason of the instant construction the inner cover member 17 and more specifically side wall 29 is in tensioned engagement with the outer cover member 16, thereby insuring that the slots 26 will be concealed from view by the onlooker from the outer side of the wheel. It will be appreciated that the slots are disposed in a common circle concealed by said crown members since the tabs are normally in a circle of larger diameter than when in the slots. When the tabs are inserted into the slots they are adapted to engage in tensioned relationship the radially outer edges of the slots to minimize play between the cover parts.

In addition, it has been found that by circumferentially spacing the slots 26 and tabs 31, that relative co-rotation of the cover members may be insured.

In assembly of the assembled cover on the wheel, the cover is axially aligned with the wheel. As the cover and more specifically the retaining fingers are urged into engagement with the intermediate flange of the rim 10, they are resiliently flexed into tensioned cover-retaining engagement with the edges 25 biting into the intermediate rim flange.

Removal of the cover 15 may be effected by inserting a pry-off tool under the outer annular terminal portion of the cover and thereafter twisting the tool to effect disengagement.

It will be understood that modifications and variations may be effected without departing from the scope of the novel concepts of the present invention.

I claim as my invention:

1. In a multi-part wheel cover construction for disposition on the outer side of a vehicle wheel, a cover including inner crown and outer annular cover members having means for retaining the assembled cover on the wheel, said outer annular cover member having a radially inwardly extending portion with a circular slotted area, said inner crown member including an annular resilient generally axially extending corrugated side wall provided with a deflectable resilient margin cooperable with said slotted area in tensioned slot-concealing relationship.

2. In a wheel structure including a wheel, a multi-part wheel cover assembly for disposition on the outer side of a vehicle wheel, and having means to maintain the cover assembly on the wheel, said cover assembly including inner crown and outer annular cover members having means for retaining the assembled cover on the wheel, said outer annular cover member having an intermediate cover portion with a circular slotted area, said inner crown member including an annular generally axially extending side wall provided with a resiliently deflectable undulated margin co-operable with said slotted area in tensioned slot-concealing relationship, said margin having a normal diameter slightly larger than the diameter of the circular slotted area so that the resiliently deflectable margin may engage under tension with the circular slotted area to effect tensioned assembly between the cover members.

3. In a multi-part wheel cover construction for disposition on the outer side of a vehicle wheel, a cover including inner crown and outer annular cover members having means for retaining the assembled cover on the wheel, said outer annular cover member having a radially inwardly extending portion with a circular slotted area, said inner crown member including an annular resilient generally axially extending corrugated side wall provided with a deflectable resilient margin cooperable with said slotted area in tensioned slot-concealing relationship, said outer annular cover member comprising an annular ring with the central area removed to provide a light weight construction and to reduce the cost of material in the cover.

4. In a multi-part wheel cover construction for disposition on the outer side of a vehicle wheel, a cover including inner crown and outer annular cover members having means for retaining the assembled cover on the wheel, said outer annular cover member having a radially inwardly extending portion with a circular slotted area, said inner crown member including an annular resilient generally axially extending corrugated side wall provided with a deflectable resilient margin cooperable with said slotted area in tensioned slot-concealing relationship, said resilient margin having circumferentially spaced deflectable tabs for locking engagement with the slots in the circular slotted area.

5. In a multi-part wheel cover construction for disposition on the outer side of a vehicle wheel, a cover including inner crown and outer annular cover members having means for retaining the assembled cover on the wheel, said outer annular cover member having a radially inwardly extending portion with a circular slotted area, said inner crown member including an annular resilient generally axially extending corrugated side wall provided with a deflectable resilient margin cooperable with said slotted area in tensioned slot-concealing relationship, the corrugated side wall being divided up into raised and collapsed side wall portions with the tabs extending from one of said side wall portions.

6. In a multi-part wheel cover construction for disposition on the outer side of a vehicle wheel, a cover including inner crown and outer annular cover members having means for retaining the assembled cover on the wheel, said outer annular cover member having a radially inwardly extending portion, said inner crown member including an annular resilient generally axially extending corrugated side wall provided with a deflectable resilient margin cooperable with said radially inwardly extending portion on said outer cover member, one of said members provided with a circular slotted area and the other of said members provided with circularly arranged tabs and with the diameters of the circles of the slotted area and the tabs being slightly at variance enabling the tabs to be engaged in the slotted area in tensioned assembly of the members upon deflecting the deflectable resilient margin of the inner crown member.

7. In a multi-part wheel cover construction for disposition on the outer side of a vehicle wheel, a cover including inner crown and outer annular cover members having means for retaining the assembled cover on the wheel, said outer annular cover member having a radially inwardly extending portion with a circular slotted area, said inner crown member including an annular resilient generally axially extending corrugated side wall provided with a deflectable resilient margin cooperable with said slotted area in tensioned slot-concealing relationship, said deflectable resilient margin including tabs provided at circumferentially spaced intervals on the axially inner radially outer edge area of the resilient margin, the tabs being engageable in the slotted area to sustain the cover members together in assembly.

References Cited in the file of this patent

UNITED STATES PATENTS

| | | |
|---|---|---|
| 2,226,098 | Hedstrom | Dec. 24, 1940 |
| 2,276,405 | Lyon | Mar. 17, 1942 |